United States Patent [19]
Lunscher

[11] Patent Number: 5,973,310
[45] Date of Patent: Oct. 26, 1999

[54] OPTICAL ACQUISITION AND TRACKING SYSTEM

[75] Inventor: Wolfram Lunscher, Nepean, Canada

[73] Assignee: EMS Technologies Canada, Ltd., Ottawa, Canada

[21] Appl. No.: 08/987,447

[22] Filed: Dec. 10, 1997

[51] Int. Cl.[6] .................................................. G01J 1/20
[52] U.S. Cl. ............................ 250/203.1; 250/203.3; 250/208.1; 250/201.1
[58] Field of Search .............................. 250/208.6, 203.1, 250/203.3, 203.4, 203.6, 208.1, 201.1; 356/152.2; 359/152, 172

[56] References Cited

U.S. PATENT DOCUMENTS

| | | |
|---|---|---|
| 3,504,182 | 3/1970 | Pizzurro et al. . |
| 3,799,675 | 3/1974 | Johnson . |
| 4,491,982 | 1/1985 | Candy et al. . |
| 4,764,982 | 8/1988 | Pfund . |
| 4,823,402 | 4/1989 | Brooks . |
| 5,062,150 | 10/1991 | Swanson . |
| 5,227,619 | 7/1993 | Vilaire et al. . |
| 5,329,513 | 7/1994 | Nose et al. . |
| 5,343,287 | 8/1994 | Wilkins . |
| 5,517,016 | 5/1996 | Lesh et al. ........................... 250/201.1 |
| 5,528,391 | 6/1996 | Elrod . |

FOREIGN PATENT DOCUMENTS 2 720 034  7/1996  France .

OTHER PUBLICATIONS

"Breadboarding of a High Bandwidth Acquisition and Fine Tracking System for Satellite Optical Communications" Optical Space Communication EC02, Paris Apr. 24–26, 1989, No. vol. 1131, Apr. 24, 2989, pp. 116–127.

Baister G et al: "Pointing Acquisition and Tracking for Optical Space Communications" Electronics and Communication Engineering Journal, vol. 6, No. 6, Dec. 1, 1994, pp. 271–280.

*Primary Examiner*—Edward P. Westin
*Assistant Examiner*—Thanh X. Luu
*Attorney, Agent, or Firm*—Pascal & Associates

[57] ABSTRACT

A method of processing an electromagnetic signal received and contained completely within the bounds of a two dimensional signal detection array, is comprised of (a) determining a position of the signal in a large window on the detector array, (b) reducing the dimensions of the window by a predetermined ratio with the position of the signal at the center thereof, (c) locating the position of the signal in the reduced size window (d) repeating steps (b) and (c) until the window is a predetermined number of pixels in size, and (e) continuously monitoring the presence and location of the signal.

20 Claims, 4 Drawing Sheets

OPTICAL ACQUISITION AND TRACKING SYSTEM

FIELD OF THE INVENTION

This invention relates to the field of remote signal acquisition and tracking, such as acquisition and tracking of an optical signal.

BACKGROUND TO THE INVENTION

Communications in space requires the acquisition and tracking of an electromagnetic signal source by a signal receiver. Such systems can also be used to track stars, beacons, satellites, etc. While such systems typically use light as the electromagnetic signal to be tracked, it will be understood that, signals outside the frequency bands of visible light could be tracked, such as X-ray signal sources, etc., assuming an appropriate signal detector is used for the frequencies of interest. While optical signals will be described herein, this should be construed to include other signals having the characteristics of a beam that can be completely imaged within the bounds of an appropriate detector array.

An optical acquisition and tracking system is described in the paper "Pointing, Acquisition and Tracking For Optical Space Communications", by G. Baister and P. V. Gatenby, Electronics & Communication Engineering Journal, December 1994, pages 271–280. This system uses gimbals to point an optical detector array in coarse and fine pointing loops, and an electronic quadrant detector to define the position of the signal on the array and provide signals which are used to control the gimbals.

The quadrant detector achieves high precision only within a restricted field of view, requiring precise adjustment of the system optics, and precise alignment of the acquisition and tracking system to the user terminal. Long-term stability of all adjustments and alignments are critical, and offset tracking from the optical boresight by an arbitrary angle is not possible.

Detection of an optical signal by a charge coupled device (CCD) array, and processing though a Fourier transform of the resulting signal has been described in U.S. Pat. No. 5,343,287 issued Aug. 30, 1994 to Wilkins, for determining atmospheric turbulence and angle of arrival changes in a laser communications signal. This system obtains, from the Fourier processed signal, an airy disk (a bright spot at the center of diffraction rings), to determine the signal location. The system is directed to a communication link having at least one end within the atmosphere, which diffuses and distorts the signals. The signals which it processes are typically strong and reliable. It cannot determine the location of a signal source to the precision typically required in systems permanently operated above the atmosphere, which signals can be extremely weak, and cannot tolerate variations in those signals with the tolerances typically obtained in atmosphere-corrected signals. Due to the nature of the system, it is difficult to track and acquire weak signals.

SUMMARY OF THE INVENTION

The present invention is a method of detecting the presence of (acquiring) an optical signal within a large field of view, determined by the user's optical design, and of tracking the optical signal to high precision, e.g. <0.1% of that field of view. A stable, long-term physical alignment of the received signal relative to the optical boresight of a user terminal can thus be obtained. The tracking error signal produced can be used to control pointing of the optics of the user terminal system. Once set up, precise adjustment of the optics in a system using the method of the invention can be avoided. Alignment, calibration and subsequent recalibration can be performed in software. A system using the invention can track, and if the signal is lost, reacquire the signal within a wide field of view and track to the precision noted above. It is thus suitable to use in above-the-atmosphere applications.

In accordance with an embodiment of the invention, a method of processing an electromagnetic signal received and contained completely within the bounds of a two dimensional signal detection array, comprises the steps of: (a) binning signals from each row and column of the array, (b) locating a position of the signal within the array by performing a modified discrete Fourier transform on the binned signals, (c) associating the signal center with an array location corresponding to an extracted phase shift, and (d) constraining the maximum phase shift to $\pm\pi$ radians.

In accordance with another embodiment, a method of processing an electromagnetic signal received and contained completely within the bounds of a two dimensional signal detection array, is comprised of (a) binning signals from each row and column of the array, (b) locating a position of the signal within the array by performing a Finite Impulse Response transform $$S_1 = \sum_{n=0}^{N-1} input_n \cdot \left(-\cos\left(\frac{2\cdot\pi\cdot n}{N}\right) - j\cdot\sin\left(\frac{2\cdot\pi\cdot n}{N}\right)\right)$$

on the binned signals, where S1 represents the output signal, and N is number of samples of the binned signals, and (c) constraining the maximum phase shift to $\pm\pi$ radians and declaring the signal center at an array location corresponding to the phase angle of the complex number produced by the transform.

In accordance with another embodiment, a method of processing an electromagnetic signal received and contained completely within the bounds of a two dimensional signal detection array, comprises the steps of: (a) binning signals detected by rows and columns of devices of the array, (b) collecting N image samples of the binned signals, (c) calculating an output error angle $\theta$ in each of two orthogonal (x,y) directions for each sample, and with a range of $\pm/\pi$ radians, (d) computing the variance of the error angles:

$$\sigma^2_{\theta\_out} = \frac{1}{N}\cdot\sum_N \theta^2 - \left(\frac{1}{N}\cdot\sum_N \theta\right)^2$$

and comparing it to $\pi^2/12$, (e) if the variance is less than $\pi^2/12$, proceed with acquisition, and if the variance is not less than $\pi^2/12$, continuing sampling.

In accordance with another embodiment, a method of processing an electromagnetic signal received and contained completely within the bounds of a two dimensional signal detection array, comprises the steps of: (a) determining-a position of the signal in a large window on the detector array, (b) reducing the dimensions of the window by a predetermined ratio with the position of the signal at the center thereof, (c) locating the position of the signal in the reduced size window, (d) repeating steps (b) and (c) until the window is a predetermined number of pixels in size, and (e) continuously monitoring the presence and location of the signal.

BRIEF INTRODUCTION TO THE DRAWINGS

A better understanding of the invention will be obtained by considering the detailed description below, with reference to the following drawings, in which.

DETAILED DESCRIPTION OF PREFERRED EMBODIMENTS

Figure 1:
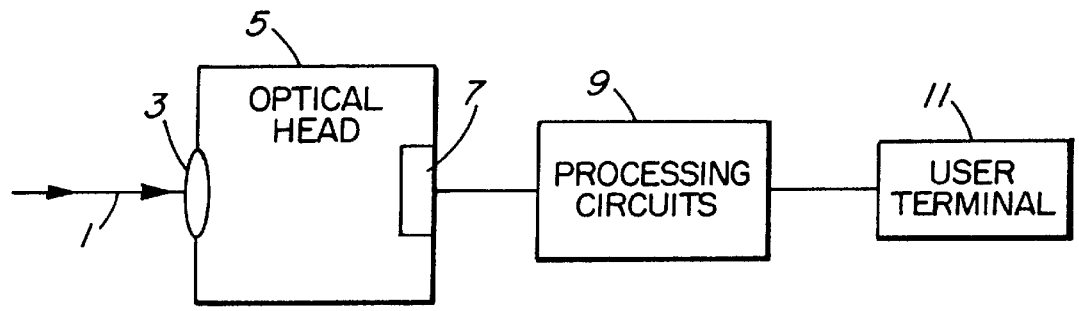
FIG. 1 is block diagram of a system in which the invention can be implemented.

Turning to FIG. 1, an incoming optical signal 1 passes through the imaging system (depicted as a lens) 3 of an optical head 5, and impinges on a detector array 7. A charge-coupled device (CCD) array will be used as a typical example, though any array detector technology, such as an active pixel sensor array, would serve as well. The output signal of the CCD is applied to processing circuits 9; and the output signal of the processing circuits is applied to a user terminal 11, and to a pointing control system (not shown). The lens system structure shown is not part of the present invention, and any imaging system which can focus an optical signal 1 on the detector array 7 can be used.

Figure 2:
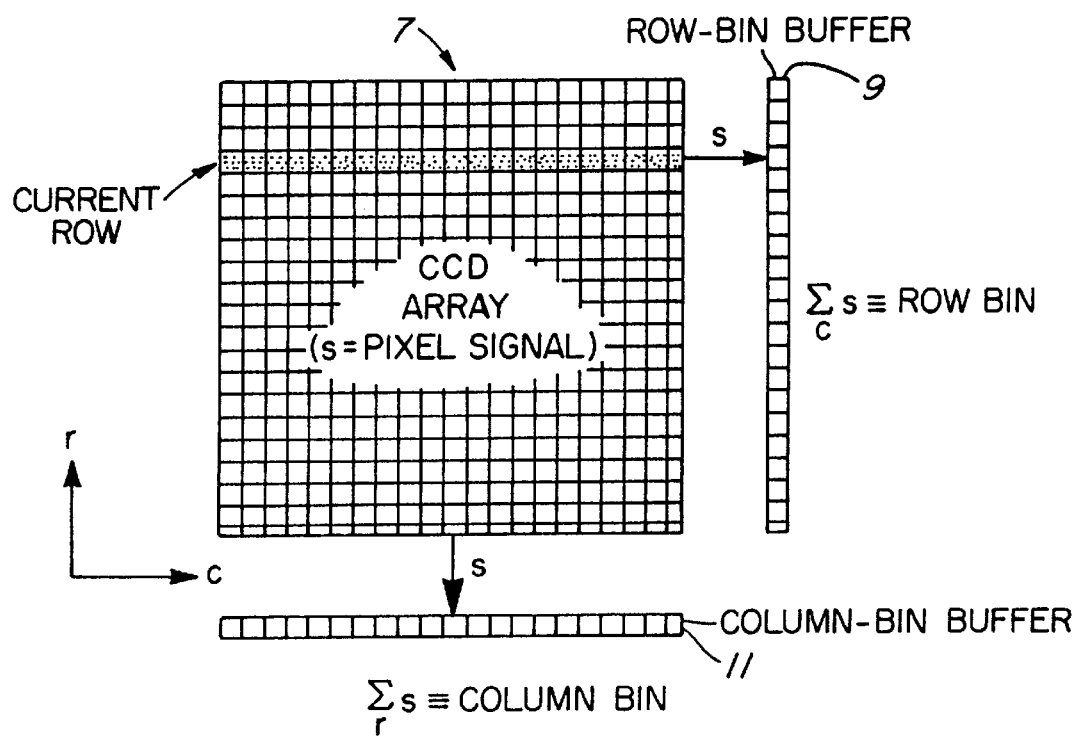
FIG. 2 illustrates a CCD array.

FIG. 2 illustrates a CCD 7 array used in the optical head 5, each charge coupled device element corresponding to a pixel. A typical CCD array can be formed of 64×64 charge coupled device elements, forming a 4,096 pixel array. A row bin buffer memory 9 (buffer) is associated with each row of charge coupled device elements in the array, and a column bin buffer memory 11 (buffer) is associated with each column of charge coupled device elements in the array. When the optical signal is optically applied to the surface of the CCD devices, the signals s of the pixels in each row and column of the array should be binned (summed) and stored in the buffers in real time. The signals stored in the buffers are then operated on as will be described below.

Two buffers can be used to receive the digitized pixel data of each line read from the CCD. Preferably under direct memory access (DMA) control, one buffer is used to capture data from the current CCD line being read while the other buffer holds the data from the previous line while it undergoes the binning operation by the processing circuitry, such as a digital signal processor (DSP). This operation can be performed by the same DSP used to perform the ecartometry signal processing. On completion of the capture and binning operations for a given line the assigned buffers switch and the process repeats until the entire array has been read. Binning therefore completes soon after the array has been read allowing ecartometry signal processing to proceed immediately afterward.

The pixel data stored in the two bin buffers (one for rows, one for columns) is now processed to determine the location of the signal in the CCD array. A method herein named frequency domain phase detection (FDPD) ecartometry is used, wherein the phase of the processed signal indicates the location of the optical signal.

Figure 3:
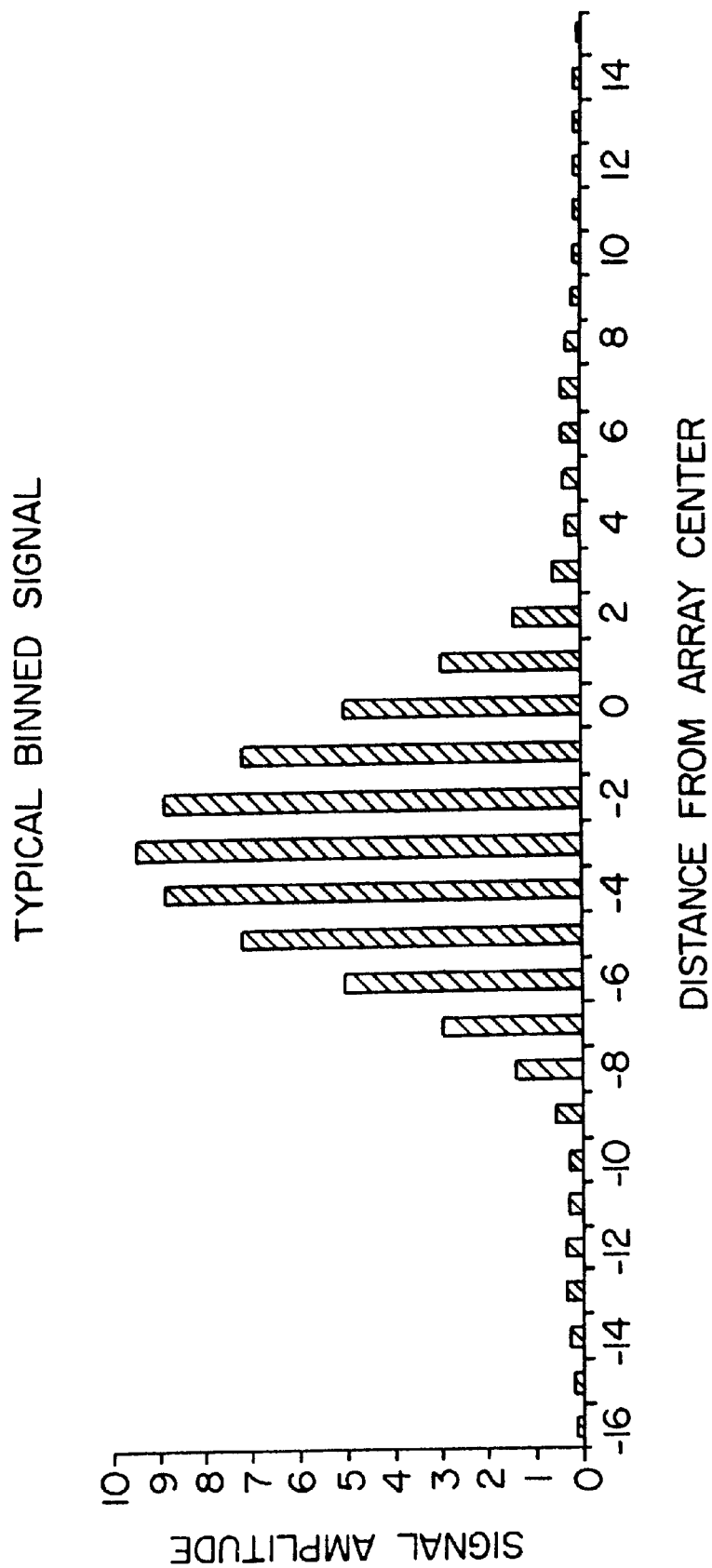
FIG. 3 illustrates a representative binned signal amplitude along the row or column direction of CCD devices.
Figure 4:
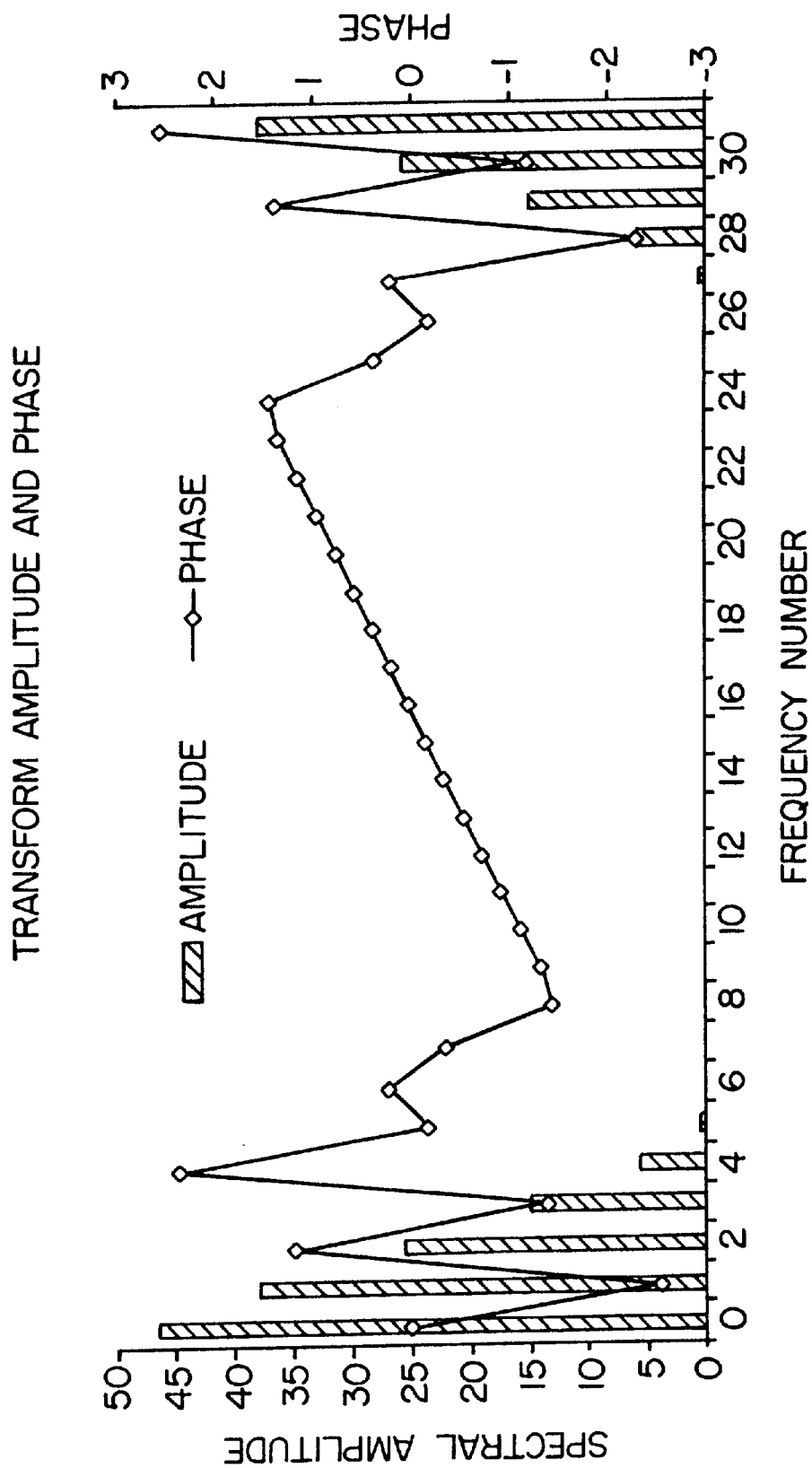
FIG. 4 illustrates the transform of the signal for the sample illustrated in FIG. 3.

Turning to FIG. 3, the amplitude of a signal s along one of the bin buffers is shown. The binned signal amplitude at representative positions is shown by the vertical lines, which samples are the values of the sums along either rows or columns of the array. The binned signal is subjected to a modified Fourier transform, which transforms it to the frequency domain where each discrete frequency is characterized by an amplitude and an associated phase, as shown in FIG. 4.

If S(u,v) is the Fourier transform of s(x,y), (where s is the amplitude of the signal at CCD coordinates x and y), then shifting the pattern by $x_o$ and $y_o$ adds a phase change to S(u,v):

$$s(x-x_o, y-y_o) \longleftrightarrow S(u,v)e^{-j2\pi(ux_o+vy_o)}$$

or, for an N-sample discrete Fourier transform:

$$s(x-x_o, y-y_o) \longleftrightarrow S(u,v)e^{-j2\pi(ux_o+vy_o)/N}$$

In order that the mapping between the position shift ($x_o$, $y_o$) and the resultant phase shift be unique, the maximum phase shift should be constrained to $\pm\pi$. To constrain the phase shift to $\pm\pi$, u and v must equal 1. Signal pattern error angles are determined from the arc tangent of the imaginary to real component ratio of the transform at u=v=1. The signal is thus located at the CCD position associated with the phase shift. The resultant phase angle can be scaled to any units desired, for example pixel position or signal incident angle. Furthermore, mechanical misalignments of the optical head components can be compensated by adding a fixed calibration constant in software to the calculated signal position value. As each frame of the CCD is scanned, the signal position in both horizontal and vertical directions can be determined from the information contained in the two orthogonal row and column bin buffers.

The ecartometry method used is derived from the Discrete Fourier Transform (DFT):

$$S_u = \sum_{n=0}^{N-1} input_n \cdot \left( \cos\left(\frac{2\cdot\pi\cdot n\cdot u}{N}\right) - j\cdot\sin\left(\frac{2\cdot\pi\cdot n\cdot u}{N}\right) \right)$$

The phase produced by a signal located near the center of the field of view is $\pm\pi$ radians, with a discontinuity at the center. The discontinuity should be removed by reflecting the real Su value in the imaginary axis. This redefines the center as 0 radians. Performing the reflection and constraining the transform to u=v=1 produces the preferred transform:

$$S_1 = \sum_{n=0}^{N-1} input_n \cdot \left( -\cos\left(\frac{2\cdot\pi\cdot n}{N}\right) - j\cdot\sin\left(\frac{2\cdot\pi\cdot n}{N}\right) \right)$$

This can be realized as a finite impulse response (FIR) filter, which is readily implemented with a DSP.

Determining when a signal is present employs a statistical acquisition method, as follows:

1) Collect N image samples. Typically N=30. The exact number depends on the user's immediate requirements.

2) Calculate output error angle, $\theta$, in each of the two orthogonal (x,y) directions for each sample (range=$\pm\pi$ radians).

3) Compute the variance of the error angle:

$$\sigma^2_{\theta\_out} = \frac{1}{N}\cdot\sum_N \theta^2 - \left(\frac{1}{N}\cdot\sum_N \theta\right)^2$$

where $$\sum_N$$

means: sum over the last N samples and compare it to $\pi^2/12$.

4) If the variance is less, proceed with acquisition; or else continue sampling.

5) Afterward, while tracking the detected signal, perform the above variance calculation on an ongoing basis on the last N positions. Should the variance exceed $\pi^2/12$ the signal will be considered lost and the system should initialize and return to the acquisition mode.

Frequency domain phase detection (FDPD) as described above is the preferred ecartometry method because it produces an output signal that is very linear over the entire field of view, and background noise dc offset is inherently rejected. A delicate mechanical alignment of the optical head is not required; the system can be calibrated in software. The method favors a defocused signal pattern sampled at many data points, relaxing optical system constraints. Performance is dependent only on the spatial noise content of the u=v=1 line.

Figure 5:
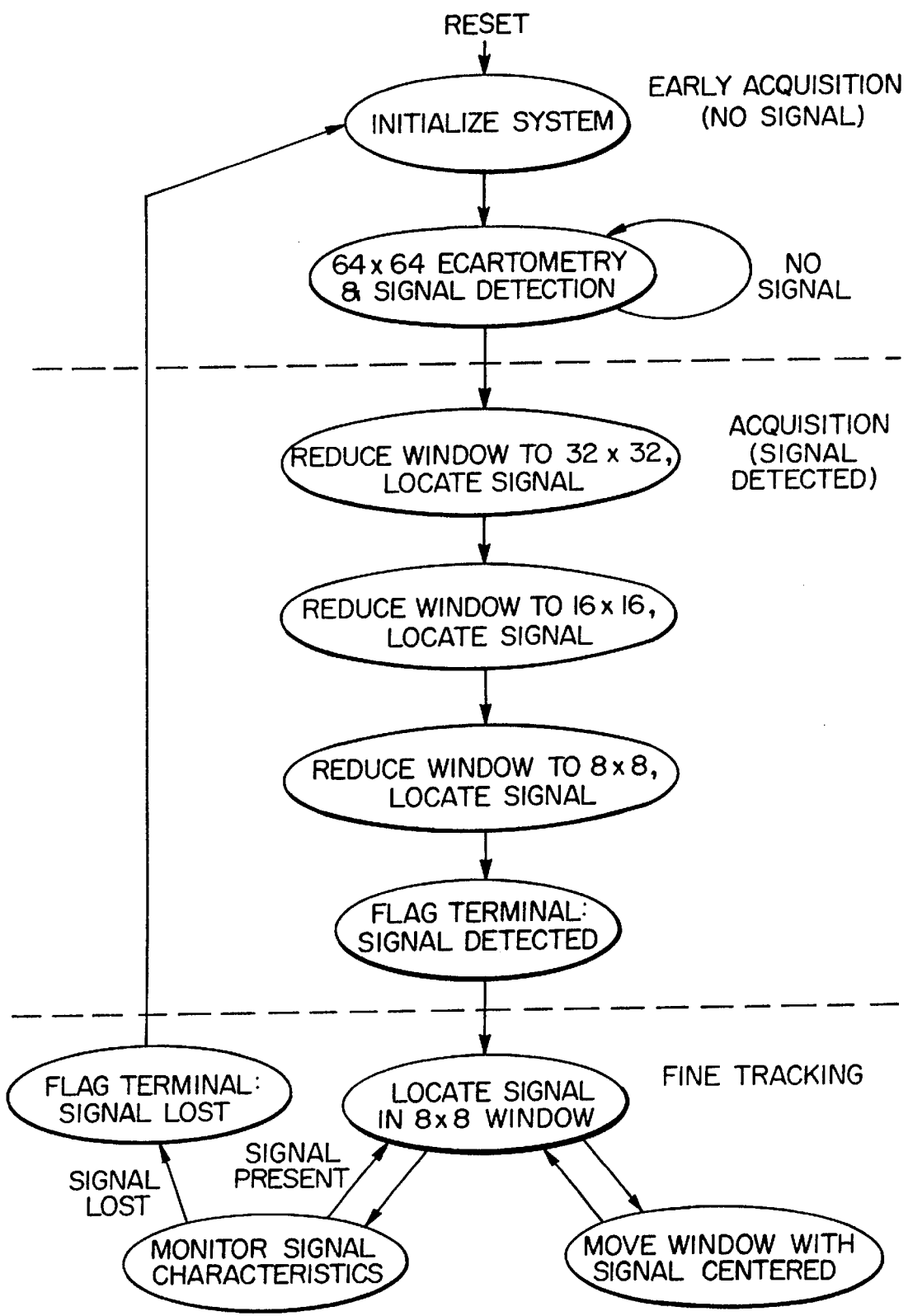
FIG. 5 is a flow chart illustrating a method of locating and tracking of the signal with high precision.

Locating the signal with high precision, and tracking of the signal can be performed using the following method. Reference is also made to the flow chart of FIG. 5.

1) On detection of a signal as described above, using e.g. a 64×64 pixel array, the signal's determined location on the detector array becomes the center of a window one half the diameter of the original. The position of the window's perimeter is constrained so that the reduced window is always fully contained within the detector array.

2) A new frame of the image is then sampled using the reduced window, and the FDPD process is applied to locate the signal within this window. This location is again used as the position of the center of another window one half the diameter of the previous window.

3) This progressive reduction in window size continues until the window is a minimum eight pixels in diameter (the signal image has been found to be best maintained between 3 and 4 pixels in diameter).

4) The FDPD process is then applied only within this minimal window until the signal is determined to be lost. The position information returned is used to continually reposition the window on the detector array with the purpose of maintaining the window centered on the signal; but also wholly contained on the detector array.

5) The signal position information is also scaled to the units desired by the user (e.g. degrees of arc) representing the position within the field of view in orthogonal (x,y) coordinates. By performing tracking within this minimal window, the system's signal to noise ratio is maximized and the user receives signal position information to the highest precision achievable.

The FDPD process thus can be used during both acquisition and tracking. The only distinction is that during acquisition, the process is initially applied to a large window containing most of the detector array, whereas tracking takes place within a minimal, 8×8 window. It also allows off-center (away from the system optical boresight) tracking by an amount corresponding to the terminal's point-ahead angle.

While a DSP is described above as a means for performing binning, the FDPD process, and windowing, other structures could be used. For example, binning could be integrated with the detector, or performed with cylindrical lenses and linear arrays. FDPD could be performed by a dedicated Fourier transform processor. Binning and the FDPD process could be combined with a dedicated 2-D Fourier transform processor, since the position phase angle is exactly equivalent to the phase on the 2-D transform axis, at the u=v=(1,0) and (0,1) spatial frequency points.

A person understanding this invention may now conceive of alternative structures and embodiments or variations of the above. All those which fall within the scope of the claims appended hereto are considered to be part of the present invention.

I claim:

1. A method of processing an electromagnetic signal received and contained completely within the bounds of two dimensional signal detection array, comprising:

(a) determining a position of said signal in a large window on the detector array, (b) reducing the demensions of the window by a predetermined ratio with the position of the signal at the center thereof, (c) locating the position of the signal in the reduced size window, (d) repeating steps (b) and (c) until the window is a predetermined number of pixels in size, and (e) continuously monitoring the presence and location of the signal, in which the locating step is comprised of transforming the signal within each window using the Fourier transform variant $$S_1 = \sum_{n=0}^{N-1} input_n \cdot \left( -\cos\left(\frac{2 \cdot \pi \cdot n}{N}\right) - j \cdot \sin\left(\frac{2 \cdot \pi \cdot n}{N}\right) \right)$$

where S1 represents the output signal, and N is number of samples of the binned signals, to determine the phase and therefore the position of the signal within each window.

2. A method as defined in claim 1 including the step of moving the window having the predetermined number of pixels to relocate the signal at its center in the event the signal moves off its center.

3. A method as defined in claim 1 including repeating steps (a)–(e) in the event the signal is lost.

4. A method as defined in claim 1 in which the predetermined number of pixels in step (d) is eight.

5. A method as defined in claim 1 in which the reducing step (b) reduces the size by one-half.

6. A method as defined in claim 1 in which the predetermined number of pixels in step (d) is eight and in which the diameter of the signal is approximately 3 to 4 pixels.

7. A method as defined in claim 1, in which the signal is an optical signal.

8. A method as defined in claim 7 in which the detection array is a charged couple device array or an active pixel sensor array.

9. A method of processing an electromagnetic signal received and contained completely within the bounds of a two dimensional signal detection array, comprising:

(a) binning signals from each row and column of the array, (b) locating a position of the signal within the array by performing a Finite Impulse Response transform $$S_1 = \sum_{n=0}^{N-1} input_n \cdot \left( -\cos\left(\frac{2 \cdot \pi \cdot n}{N}\right) - j \cdot \sin\left(\frac{2 \cdot \pi \cdot n}{N}\right) \right)$$

on the binned signals, where Sl represents the output signal, and N is number of samples of the binned signals, and (c) constraining the maximum phase shift to ±π radians and declaring the signal center at an array location corresponding to the phase angle of the complex number produced by the transform.

10. A method as defined in claim 9 in which the locating and constraining steps further include:
(a) determining a position of said signal in a large window on the detector array,
(b) reducing the dimensions of the window by a predetermined ratio with the position of the signal at the center thereof,
(c) locating the position of the signal in the reduced size window,
(d) repeating steps (b) and (c) until the window is a predetermined number of pixels in size, and
(e) continuously monitoring the presence and location of the signal.

11. A method as defined in claim 10 including the step of moving the window having the predetermined number of pixels to relocate the signal at its center in the event the signal moves off its center.

12. A method as defined in claim 10 in which the transform is implemented in a finite impulse response (FIR) filter.

13. A method as defined in claim 9, including performing the transform successively on progressively smaller windows of binned signals centered on the location of the signal found in step (b), to a predetermined minimum window size.

14. A method as defined in claim 9, in which the signal is an optical signal.

15. A method as defined in claim 14 in which the detection array is a charged couple device array or an active pixel sensor array.

16. A method of processing an electromagnetic signal received and contained completely within the bounds of a two dimensional signal detection array, comprising:
(a) binning signals detected by rows and columns of devices of the array,
(b) collecting N image samples of the binned signals,
(c) calculating an output error angle θ in each of two orthogonal (x,y) directions for each sample, and with a range of ±π radians,
(d) computing the variance of the error angle:

$$\sigma_{\theta\_out2} = \frac{1}{N} \cdot \sum_N \theta^2 - \left(\frac{1}{N} \cdot \sum_N \theta\right)^2$$

and comparing it to $\pi^2/12$,
(e) if the variance is less than $\pi^2/12$, proceed with acquisition, and if the variance is not less than $\pi^2/12$, continue sampling.

17. A method as defined in claim 16, including the further steps of:
(f) while tracking a detected signal, repeat steps (d) and (e) on an ongoing basis on the last N positions, and
(g) in the event the variance exceeds $\pi^2/12$, consider the signal as lost and repeating steps (a)–(e).

18. A method as defined in claim 16, in which the signal is an optical signal.

19. A method as defined in claim 18 in which the detection array is a charged couple device array or an active pixel sensor array.

20. A method of processing an electromagnetic signal received and contained completely within the bounds of a two dimensional signal detection array, comprising the steps of: (a) binning signals from each row and column of the array, (b) locating a position of the signal within the array by performing a modified discrete Fourier transform on the binned signals, (c) associating the signal center with an array location corresponding to an extracted phase shift, and (d) constraining the maximum phase shift to ±π radians.

* * * * *